(12) United States Patent
Yumura et al.

(10) Patent No.: US 7,091,423 B2
(45) Date of Patent: Aug. 15, 2006

(54) SUPERCONDUCTING CABLE

(75) Inventors: Hiroyasu Yumura, Osaka (JP); Naoki Ayai, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 22 days.

(21) Appl. No.: 10/819,113

(22) Filed: Apr. 7, 2004

(65) Prior Publication Data

US 2004/0200637 A1    Oct. 14, 2004

(30) Foreign Application Priority Data

Apr. 10, 2003  (JP)  ............................. 2003-106953

(51) Int. Cl.
*H01B 12/00*  (2006.01)

(52) U.S. Cl. ...................... 174/125.1; 29/599; 505/232

(58) Field of Classification Search ............. 174/125.1, 174/15.4, 15.5; 29/599; 505/230, 231, 232, 505/704

See application file for complete search history.

(56) References Cited

U.S. PATENT DOCUMENTS

| | | | |
|---|---|---|---|
| 5,952,614 A * | 9/1999 | Ries | ...................... 174/106 R |
| 6,247,225 B1 * | 6/2001 | Snitchler et al. | ............... 29/599 |
| 6,360,425 B1 * | 3/2002 | Christopherson et al. | ..... 29/599 |
| 6,417,458 B1 * | 7/2002 | Mukoyama et al. | ..... 174/125.1 |
| 6,596,945 B1 * | 7/2003 | Hughey et al. | .......... 174/125.1 |

FOREIGN PATENT DOCUMENTS

| | | |
|---|---|---|
| EP | 0 638 942 B1 | 6/2001 |
| JP | 7-105753 A | 4/1995 |
| JP | 9-45150 A | 2/1997 |
| JP | 2001-265845 A | 9/2001 |
| JP | 2001-266668 A | 9/2001 |

OTHER PUBLICATIONS

S. Mukoyama et al., "AC Losses of a Multi-layer Conductor Using Bi2223 Tapes with Twisted Filaments," Advances in Super Conductivity—Proceedings of the 12th International Symposium on Superconductivity, 1999, pp. 754-756.

* cited by examiner

*Primary Examiner*—Ishwar (I. B.) Patel
(74) *Attorney, Agent, or Firm*—Foley & Lardner LLP

(57) ABSTRACT

A superconducting cable has a plurality of superconducting wires wound around a core material (former) in a multilayered manner. The superconducting wires employ a twisted filament type superconducting wire having spiral superconducting filaments and an untwisted filament type superconducting wire having straight superconducting filaments. The layer in which an applied magnetic field is large and of which the low loss effect is expected is formed of twisted filament type superconducting wires, and the other layers are formed using the untwisted filament type superconducting wires; thus the AC loss can be reduced effectively. Thus, in the superconducting cable, the AC loss can be effectively reduced while a degradation of the current characteristics and the increase of cost are suppressed.

7 Claims, 2 Drawing Sheets

SUPERCONDUCTING CABLE

BACKGROUND OF THE INVENTION

1. Field of the Invention

The present invention relates to superconducting cables, and particularly to a multilayer high-temperature superconducting cable in which alternating current (AC) loss can be reduced.

2. Description of the Related Art

Advances have been made in the development of compact, bulk-power-transmission superconducting cables. Superconducting cables generally have a multilayer cable structure in which a plurality of layers of superconducting tapes are spirally wound around a core material (former). Superconducting tapes are Bi-based Ag-sheathed superconducting tapes having Bi-based high-temperature superconducting filaments embedded in an Ag matrix, or the like.

In such a multilayer cable structure, for example, when the tapes are wound with a constant pitch in winding directions which are alternately opposite with respect to adjacent layers, a nonuniform current flow occurs due to the difference in impedance among the layers. That is, a larger current flows in an outer layer of lower impedance, and a smaller current flows in an inner layer of higher impedance. Such nonuniform current flow causes each layer to behave electromagnetically as a single block (i.e., so-called monoblock model), which results in high AC loss.

Accordingly, the phenomenon of nonuniform current flow must be suppressed in order to reduce the AC loss. One of the countermeasures for suppressing nonuniform current flow is to achieve uniformity of impedance across the layers. Specifically, the winding pitches and winding directions in the layers are adjusted so that the layers have uniform impedance to provide uniform current distribution (see, for example, Japanese Unexamined Patent Application Publication No. 9-45150). As a result of achieving such uniformity in current flow, the AC loss can be reduced to about 1/(the number of layers) as compared with the case in which otherwise nonuniform current flow might occur in the layers.

Another approach has been proposed in which superconducting filaments are twisted in a tape so as to reduce the AC loss of the tape itself, and such superconducting tapes having twisted superconducting filaments are used in a cable in order to obtain a low-loss cable (see, for example, Japanese Unexamined Patent Application Publication No. 7-105753).

However, even when the winding pitches of the tapes are adjusted to achieve the uniformity of current flow across the layers, the AC loss can be reduced to the level of only about 1/(the number of layers) as compared with the AC loss which may be caused in a case of mono-block model.

When superconducting wires or tapes having twisted superconducting filaments (hereinafter such superconducting wires and tapes are both referred to as "twisted filament type superconducting wires") are used in a cable, the loss can be further reduced. In such case, however, there are problems in that the application of twisting in the process of forming superconducting wires causes a reduction of critical current (Ic) and breakage of filament wires, etc., resulting in the decrease of the yield, the degradation of current-carrying properties of the cable, and the increase of manufacturing cost.

SUMMARY OF THE INVENTION

Accordingly, it is an object of the present invention to provide a superconducting cable in which the AC loss can effectively be reduced without causing the degradation of the current-carrying properties and the increase of cost.

The above-described object of the present invention can be achieved by using twisted filament type superconducting wires in limited portions.

A superconducting cable according to the present invention has a plurality of superconducting wires wound around a core material in a multilayered manner, wherein the superconducting wires use both twisted filament type superconducting wires having spiral superconducting filaments therein and untwisted filament type superconducting wires having straight superconducting filaments therein.

The superconducting wires may form a multilayered conductor layer wound around the core material, and at least the outermost layer of the multilayered conductor layer may be a twisted filament type superconducting wire.

Conversely, at least the innermost layer of the multilayered conductor layer may be an untwisted filament type superconducting wire.

The superconducting wires may also be used in a magnetic shielding layer in addition to the conductor layer. That is, the superconducting wires may form a multilayered conductor layer wound around the core material and a multilayered magnetic shielding layer wound around an electrical insulation layer provided over the conductor layer. At least the innermost layer of the multilayered magnetic shielding layer may be formed of a twisted filament type superconducting wire. At least the outermost layer of the multilayered magnetic shielding layer may be formed of an untwisted filament type superconducting.

The proportion of layers formed of twisted superconducting wires in a multilayer superconducting layer, which is formed of the superconducting wires, may be ⅔ or less. Alternatively, the number of twisted filament type superconducting wires may be ⅔ or less of the total number of the superconducting wires in the whole multilayered superconducting layer.

Preferably, the superconducting wire is structured such that a plurality of high-temperature superconducting filaments are embedded in a matrix. The matrix material is preferably Ag or Ag-alloy.

Preferably, the twist pitch of each superconducting filament of the twisted filament type superconducting wire is in the range of 10 mm to 30 mm.

Each layer of the multilayered superconducting layer formed of the superconducting wires may be provided with a layer insulation.

Preferably, the superconducting wire has a uniform impedance across the layers. This results in uniform current distribution across the layers. For achieving the uniformity of impedance, preferably, the winding pitch of at least one layer is different from the winding pitch of the remaining layers.

DESCRIPTION OF THE PREFERRED EMBODIMENTS

A superconducting cable according to an embodiment of the present invention will now be described with reference to the drawings. The drawings are not necessarily to scale or dimensionally consistent with the description hereinbelow.

Cable Structure

Figure 1:
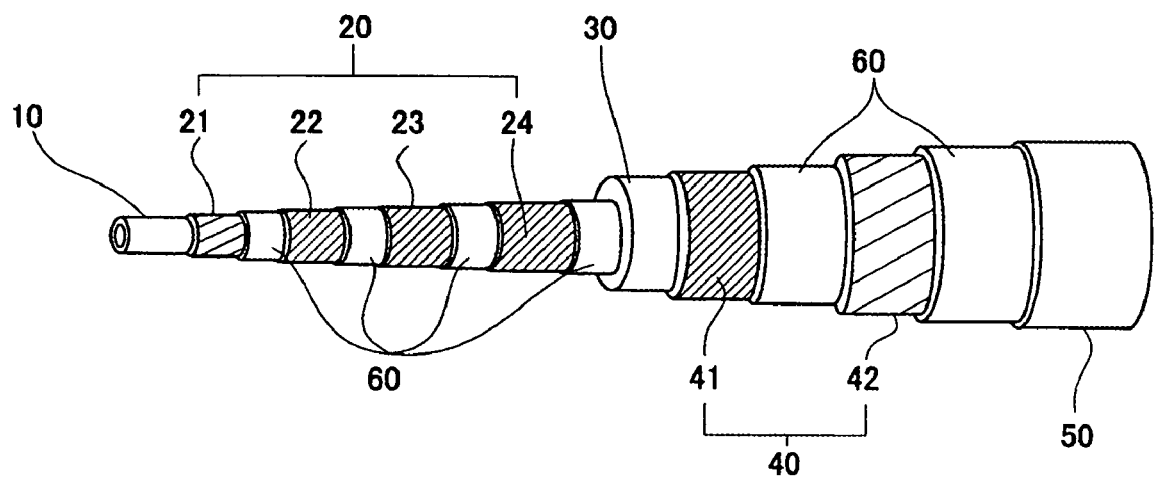
FIG. 1 is a perspective view showing the structure of an end of a cable core according to the present invention.

FIG. 1 is a perspective view showing the structure of an end of a cable core according to the present invention.

The cable core has, from the center of the core, a former 10, a conductor layer 20, an electrical insulation layer 30, a magnetic shielding layer 40, a protective layer 50, and layer insulation layers 60. In these layers, the conductor layer 20 and the magnetic shielding layer 40 are formed using superconducting wires.

Former

The former 10 may be a solid former made of stranded metal wires or a hollow former using a metal pipe. An example of the solid former is a former formed of a plurality of stranded copper wires. In such a stranded-wire former, it is possible to achieve both the reduction of AC loss and the restraint of temperature increase due to overcurrent. In a spiral-pitch-adjusted conductor in which winding pitches of superconducting layers forming a conductor layer and a magnetic shielding layer differ from one layer to another, a magnetic field is generated in a direction of the cable core axis. This axial magnetic field causes eddy currents to flow in the former, which cause loss (eddy current loss). There are two conceivable solutions to reduce the eddy current loss: (1) to increase the resistance of the material of a former so as to reduce the eddy currents to be caused, and (2) to reduce the outer diameter of the former so as to reduce the size of the eddy current loops. The application of the solution (1) is difficult since such former cannot be expected to share the current when an overcurrent flows. Thus, a stranded-wire former formed by stranding insulated small-diameter copper wires can be used to reduce the current loops, thereby reducing the eddy current loss. The stranded-wire former also can share the current when an overcurrent flows, thereby preventing the temperature increase of the cable. On the other hand, in a case where the former 10 is of a hollow type, the inside portion can be used as a coolant channel.

Conductor Layer

The conductor layer 20 is preferably formed of tapes which is made of oxide high-temperature superconducting filaments covered by a silver sheath, the filament being composed of a bismuth-based oxide superconductor or the like. The tapes are wound over the former 10 in multiple layers to form the conductor layer 20. In this embodiment, the innermost layer (the first layer 21) of the conductor layer 20, in which an applied magnetic field is small, is formed using an untwisted filament type superconducting wire, and the second through fourth conductor layers 22, 23, and 24, in which an applied magnetic field is relatively large, are formed using twisted filament type superconducting wires. The term "untwisted filament type superconducting wire" means a wire having a structure in which a plurality of straight superconducting filaments are embedded in a matrix, and the term "twisted filament type superconducting wire" means a wire having a structure such that a plurality of spiral superconducting filaments are embedded in a matrix.

In an untwisted filament type superconducting wire, since the current path for the coupling current flowing in the filaments and the matrix is very long (this current path basically is equal to the current path between the two ends of the wire) when a magnetic field is applied, the current slowly decays, and the multi-filament superconducting wire behaves as if it were a single-filament superconducting wire because of electromagnetic coupling of the filaments. In a twisted filament type superconducting wire, on the other hand, since the length of the current path of the coupling current is half of the twist pitch, the coupling current decays quickly. Thus, the effect of the multi-filament structure is achievable.

Since AC loss in a high-magnetic field region is generally proportional to filament thickness, the AC loss can be reduced in a state of electromagnetically multi-filament, that is, in a state where the filaments are electromagnetically separated. Therefore, the AC loss can be reduced by using a twisted filament type superconducting wires.

In a low-magnetic-field region, however, the twisted filament type superconducting wire exhibits higher AC loss than the untwisted filament type superconducting wire. Moreover, the twisted filament type superconducting wire may have its current-carrying capability degraded due to the twisting process, or the cost may increase due to decrease in the yield.

Accordingly, a combined use of the twisted filament type superconducting wire and the untwisted filament type superconducting wire can reduce the AC loss while the degradation of the current-carrying capability and the increase of the cable cost can be minimized. It is particularly effective to use a twisted filament type superconducting wire in a layer in which an applied magnetic field is large, and in which an effective loss reduction is expected to be achieved, while using untwisted filament type superconducting wires in the remaining layers. Preferably, a layer in which an applied magnetic field is 100 Gauss or higher is formed of a twisted filament type superconducting wire, and a layer in which an applied magnetic field is less than 100 Gauss is formed of an untwisted filament type superconducting wire.

In the outermost layer of the conductor layer, the induced current increases because the largest magnetic field is applied on the outermost layer. Thus, at least the outermost conductor layer is formed of a twisted superconducting wire, thus effectively reducing the AC loss. Conversely, if the innermost layer of the conductor layer is formed of a twisted filament type superconducting wire, the AC loss increases because the magnetic field applied on the innermost layer is small. Therefore, the innermost layer is formed of an untwisted filament type superconducting wire so that the AC loss can be suppressed.

Moreover, in order to obtain a sufficient effect of lowering the AC loss using twisted filament type superconducting wires, preferably uniform current flow is achieved in the wires forming the layers.

A specific structure for achieving uniform current flow is described in, for example, Japanese Unexamined Patent Application Publication No. 9-45150. In the disclosed structure, the winding pitch of a superconducting wire wound around a core material having an outer diameter d is not greater than the maximum effective pitch $P_{max}$ given by the following equation:

$$P_{max} = 22.0 \times d(m)$$

or the winding pitch of the superconducting wire on the outer conductor layer side is shorter than that on the inner conductor layer side.

Other suitable methods described in, for example, Japanese Unexamined Patent Application Publications No. 2001-266668 and No. 2001-265845, may also be employed. With the disclosed methods, detailed analysis of current distribution and AC loss can be made with respect to a superconducting cable having any core material resistance, any conductor size, any spiral winding direction, and any spiral winding pitch, and consequently the winding pitches of tape-like multi-filament superconducting wires can be determined so as to minimize the AC loss. Preferably, the superconducting wires are wound such that the winding direction of each layer or every plurality of predetermined layers is opposite to the winding direction of adjacent layers or adjacent plurality of predetermined layers.

In the conductor layer 20 shown in FIG. 1, the winding pitches of the superconducting wires differ from one layer to another. In addition, the winding directions change every two layers, thus providing uniform current flow in the layers.

Layer Insulation Layer

The layer insulation layers 60 are formed between the innermost superconducting layer of the conductor layer 20 and the former 10, between the layers forming the conductor layer 20, and between the layers forming the magnetic shielding layer 40. Each layer insulation layer 60 is formed of kraft paper wound around the outer periphery of each layer of the conductor layer 20 or the magnetic shielding layer 40. The layer insulation layers 60 allow the layers of the conductor layer 20 to be electrically isolated from one another, and also allow the layers of the magnetic shielding layer 40 to be electrically isolated from one another. Such layer insulation enables the effect of lowering AC loss to be sufficiently utilized.

Electrical Insulation Layer

The electrical insulation layer 30 is formed along the outer periphery of the conductor layer 20. The electrical insulation layer 30 may be formed using polypropylene laminated paper, for example, kraft paper laminated with a resin film of polypropylene (PPLP (registered trademark) made by Sumitomo Electric industries, Ltd.), which is formed on the outer periphery of the conductor layer 20.

Magnetic Shielding Layer: Shield Layer

An AC superconducting cable is provided with the magnetic shielding layer 40 around the insulation layer 30 for magnetic shielding. The magnetic shielding layer 40 is formed by winding superconducting wires over the outer periphery of the insulation layer 30. A current flowing in a direction opposite to and having substantially the same magnitude as that of the conductor layer 20 is induced in the magnetic shielding layer 40, whereby an externally generated magnetic field can be canceled. In the magnetic shielding layer 40, the effect of lowering AC loss by using a twisted filament type superconducting wire can be achieved by using such wire at least in the innermost layer where an applied magnetic field is large. Conversely, if a twisted filament type superconducting wire is used in the outermost layer where an applied magnetic field is small, the AC loss increases. Therefore, the outermost layer is formed of an untwisted filament type superconducting wire so that the loss can effectively be reduced.

Generally, the twisting process for producing twisted filament type superconducting wires results in increase of the number of processing steps and reduction in the process yield due to breakage of filament wires, and hence increase in the wire cost. Moreover, the AC loss may increase if such a twisted filament type superconducting wire is used in a low-magnetic-field layer. Therefore, by limiting the proportion of using twisted filament type superconducting wires, excessive increase in the cost can be prevented while the AC loss can be reduced effectively.

Assuming a cable having superconducting layers of four conductor layers and two magnetic shielding layers, by way of example, it is preferable that twisted filament type superconducting wires be used in the second through fourth layers of the conductor layers (the innermost conductor layer is represented by the first layer) and the first layer of the magnetic shielding layers. More preferably, the proportion is half or less.

In the superconducting cable shown in FIG. 1, a twisted filament type superconducting wire is used in the innermost layer (the first layer 41), where an applied magnetic field is large, of the magnetic shielding layer 40, and an untwisted filament type superconducting wire is used in the second layer 42 where an applied magnetic field is relatively small.

Protective Layer

The protective layer 50 is formed over the magnetic shielding layer 40. The protective layer 50 mechanically protects the construction inside the magnetic shielding layer 40, and is formed by winding a sheet of kraft paper or a fabric tape around the magnetic shielding layer 40.

Thermal Insulation Pipe

Although not shown in FIG. 1, the core is housed in a thermal insulation pipe having a double pipe structure. The thermal insulation pipe is typically formed of a corrugated inner pipe and a corrugated outer pipe such that in the space between the inner pipe and the outer pipe air is evacuated and a super insulation (trade name) made of a laminate of a plastic mesh and a metal foil is disposed.

Manufacturing of Superconducting Wire

In order to obtain a cable of the present invention, twisted filament type superconducting wires and untwisted filament type superconducting wires were manufactured in accordance with the following conditions.

A raw material powder for a superconductor is filled in a pipe of silver or silver alloy, and they are processed into a superconducting wire. Preferably, the superconductor forming a filament is an yttrium-based, bismuth-based, or thallium-based oxide superconductor. A preferable structure of a superconducting wire is such that a plurality of filaments of bismuth-based oxide high-temperature superconducting material are embedded in an Ag or Ag-alloy matrix. The wire may have any shape of cross-section not limited to a particular form: it may be a round wire or a tape having a rectangular cross-section.

Both of the twisted filament type superconducting wire and the untwisted filament type superconducting wire can be fabricated by a method such as a powder-in-tube method. For example, a twisted filament type superconducting wire having a tape-like shape can be fabricated by the following process. A raw material powder for a superconductor or a powder of superconductive material is filled in a first pipe, and the pipe is drawn into a single-filament superconducting wire. A plurality of single-filament superconducting wires are inserted into a second pipe, and then the pipe is drawn into a multi-filament superconducting wire. The multi-filament superconducting wire is twisted with a desired pitch and is subjected to slight wire drawing, and the resulting superconducting wire is rolled into a tape (first rolling). In fabricating an untwisted superconducting wire, the twisting process is omitted. Typically, after this tape is sintered (first sintering), the resulting tape is re-rolled (second rolling) and re-sintered (second sintering) to form a tape-like multi-filament superconducting wire.

An example of the raw material powder for a superconductor is a precursor composed of Bi2212 main phase (from which Bi2223 phase is formed at final sintering). The first and second pipes may be silver or silver-alloy pipes. The number of filaments is determined depending upon the final filament thickness and the size of the tape-like multi-filament superconducting wire. The number of filaments is typically about 7 to 127. The final thickness of the tape-like multi-filament superconducting wire is preferably 0.1 mm to 0.4 mm, and the aspect ratio (width/thickness) is preferably about 10 to 20.

The upper limit of the twist pitch of each filament is preferably 30 mm or less since a short pitch generally effectively contributes to the reduction of loss. However, if the twist pitch of the twisted filament type superconducting wire is extremely short, the filaments are prone to break; the longer the pitch, the easier the processing. In view of processability and Ic characteristics, therefore, the lower limit of the twist pitch is preferably 10 mm or higher.

The tape is sintered at a temperature ranging from 820° C. to 850° C. (first sintering), re-rolled, and then re-sintered at a temperature ranging from 820° C. to 840° C. (second sintering) to form a tape-like multi-filament superconducting wire.

A total of six samples (untwisted filament type and twisted filament type superconducting wires A through F) with various twist pitches and specifications were fabricated as shown in Table I.

In Table I, "Ag ratio" indicates the ratio of the matrix (Ag and Ag—Mn alloy) to a superconductor in terms of cross sections thereof, "twist pitch" indicates the pitch of a superconducting filament at the final process step of the wire, and the "n-value" indicates "n" of the voltage-current curve expressed by $V \propto I^n$ in a low-current region. The n-value is typically used as a measure for evaluating the soundness of the superconducting filaments of the wire: the n-value is low if the filaments are damaged (e.g., the filaments are uneven in the longitudinal direction or are cracked), and a weak voltage is generated from a low-current region. The proportion of layers formed using twisted filament type superconducting wires to the total of six superconductor layers was ⅔ (approximately 0.67), and the proportion of twisted filament type superconducting wires to the total of 114 superconducting wires was approximately 0.63.

Evaluation of Superconducting Wire

The Ic measurement and the AC loss measurement (applied magnetic field: 500 Gauss; frequency: 50 Hz; magnetic field direction: parallel to the wire surface) were carried out to evaluate the fabricated sample wires A through F. The results are also shown in Table I.

As the results show, in the twisted filament type superconducting wires B having a pitch as short as 5 mm, breakage of the wires occurred frequently during the twisting process (i.e., poor processability), and the critical current value (Ic) was reduced as much as by half compared to the untwisted filament type superconducting wires A. In the twisted filament type superconducting wire C having a twist pitch of 10 mm, the breakage of wires occurred less frequently than in the case of the wires B, and the Ic was not much lower than that of the untwisted filament type superconducting wires A. In the twisted superconducting wires D, E, and F having longer twist pitches, breakage of the wires did not occur during processing and the Ic was not substantially reduced.

It was further proven that the shorter the twist pitch, the lower the AC loss. However, the AC loss of the twisted superconducting wire F having a pitch of 45 mm was about 95% of the AC loss of the untwisted superconducting wire A, and was reduced by only about 5%. Therefore, a preferable twist pitch is in the range of 10 mm to 30 mm in view of processability, Ic, and AC loss.

Figure 2:
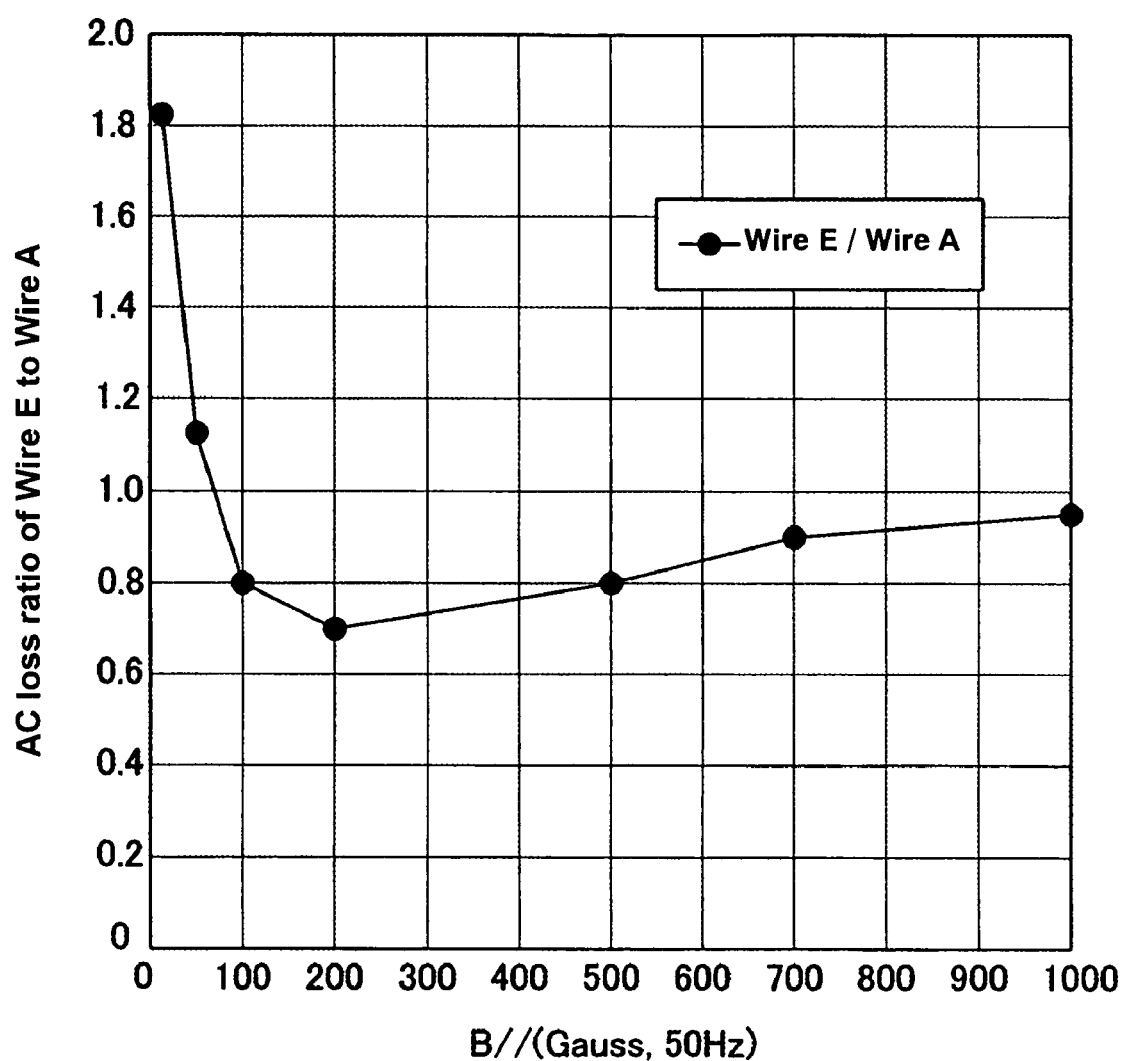
FIG. 2 is a plot showing the relationship between the magnetic field strength and the AC loss ratio (standardized AC loss) of wire E to wire A.

The AC losses of the twisted filament type superconducting wires E were measured with the applied magnetic fields varied in each measurement. The results are shown in FIG. 2. FIG. 2 is a plot showing the relationship between the magnetic field strength and the AC loss ratio of the wire E to the wire A. As is apparent from the plot shown in FIG. 2, a twisted superconducting wire exhibited high AC loss in a low-magnetic-field region of 50 Gauss or less. Therefore, in the case where twisted filament type superconducting wires are used in a cable in order to reduce AC loss, it is preferable that the wires be placed in the portion (layer) to which a 100-Gauss or higher magnetic field is applied. More preferably, a twisted filament type superconducting wire is placed in the portion in which an applied magnetic field is in the ranging of 100 Gauss to 500 Gauss.

TABLE I

|  | Wire A | Wire B | Wire C | Wire D | Wire E | Wire F |
|---|---|---|---|---|---|---|
| Superconductor | Bi2223 | Bi2223 | Bi2223 | Bi2223 | Bi2223 | Bi2223 |
| Matrix | Ag/Ag-Mn alloy | Ag/Ag-Mn alloy | Ag/Ag-Mn alloy | Ag/Ag-Mn alloy | Ag/Ag-Mn alloy | Ag/Ag-Mn alloy |
| Number of filaments | 61 | 61 | 61 | 61 | 61 | 61 |
| Ag ratio | 2.8 | 2.8 | 2.8 | 2.8 | 2.8 | 2.8 |
| Width | 3.7 mm | 3.7 mm | 3.7 mm | 3.7 mm | 3.7 mm | 3.7 mm |
| Thickness | 0.24 mm | 0.24 mm | 0.24 mm | 0.24 mm | 0.24 mm | 0.24 mm |
| Twist pitch | none | 5 mm | 10 mm | 15 mm | 30 mm | 45 mm |
| Breakage of wire during processing | does not occur | occurs frequently | occurs | does not occur | does not occur | does not occur |
| Ic | 60 A | 30 A | 55 A | 58 A | 60 A | 62 A |
| n-value | 20 | 8 | 15 | 17 | 19 | 20 |
| AC loss (500 Gauss, 50 Hz) | 440 J/m$^3$ | 250 J/m$^3$ | 290 J/m$^3$ | 310 J/m$^3$ | 350 J/m$^3$ | 420 J/m$^3$ |
| Standardized AC loss (with reference to wire A) | 1.00 | 0.57 | 0.66 | 0.70 | 0.80 | 0.95 |

EXAMPLE 1

A cable conductor having the structure shown in FIG. 1 was fabricated using the above-described sample wires. The specifications of the fabricated cable (Example 1) are shown in Table II. The cable has a stranded-wire former formed of stranded insulated Cu wires, a four-layer conductor layer over the former, and an insulation layer (with a thickness of 7 mm), and a two-layer magnetic shielding layer. The winding pitches and winding directions of the superconducting wires forming the conductor layer and the magnetic shielding layer were adjusted so as to exhibit a uniform current-carrying property.

A layer in which the maximum applied magnetic field was less than 100 Gauss was formed using the untwisted filament type superconducting wire A, and a layer in which the maximum applied magnetic field was 100 Gauss or higher was formed using the twisted filament type superconducting wire E. Specifically, the second, third, and fourth layers of the conductor layer and the first layer of the magnetic shielding layer are formed using the twisted superconducting wire E.

Comparative Example 1

A cable was prepared as Comparative Example 1, having the same structure as that of the cable of Example 1 except that the conductor layer and the magnetic shielding layer were all formed using untwisted filament type superconducting wires.

Comparative Example 2

A cable was prepared as Comparative Example 2 having the same structure as that of the cable of Example 1 except that the conductor layer and the magnetic shielding layer were all formed using twisted filament type superconducting wires.

Test Example

The AC loss measurement of the three cable samples, i.e., the cables of Example 1, Comparative Example 1, and Comparative Example 2, was carried out for evaluation. The results are shown in Table III.

TABLE II

| Material | Former stranded Cu wires with insulation | Conductor layer: 1st layer wire A (untwisted superconducting wire) | Conductor layer: 2nd layer wire E (twisted superconducting wire) | Conductor layer: 3rd layer wire E (twisted superconducting wire) | Conductor layer: 4th layer wire E (twisted superconducting wire) | Shield layer: 1st layer wire E (twisted superconducting wire) | Shield layer: 2nd layer wire A (untwisted superconducting wire) |
|---|---|---|---|---|---|---|---|
| Outer diameter (mm $\phi$) | 16.5 | 17.5 | 18.4 | 19.4 | 20.3 | 34.5 | 35.4 |
| Number of wires | — | 14 | 15 | 16 | 15 | 26 | 28 |
| Winding pitch (mm) | — | 160 | 390 | 420 | 125 | 340 | 520 |
| Winding direction | — | S | S | Z | Z | S | S |
| Bmax (@ 1 kArms) | 0 Gauss | 81 Gauss | 154 Gauss | 219 Gauss | 279 Gauss | 164 Gauss | 80 Gauss |

TABLE III

| | Item | Example 1 | Comparative Example 1 | Comparative Example 2 |
|---|---|---|---|---|
| Structure | Conductor layer: 1st layer | untwisted superconducting wire | untwisted superconducting wire | twisted superconducting wire |
| | Conductor layer: 2nd layer | twisted superconducting wire | untwisted superconducting wire | twisted superconducting wire |
| | Conductor layer: 3rd layer | twisted superconducting wire | untwisted superconducting wire | twisted superconducting wire |
| | Conductor layer: 4th layer | twisted superconducting wire | untwisted superconducting wire | twisted superconducting wire |
| | Shield layer: 1st layer | twisted superconducting wire | untwisted superconducting wire | twisted superconducting wire |
| | Shield layer: 2nd layer | untwisted superconducting wire | untwisted superconducting wire | twisted superconducting wire |
| AC loss (@ 1 kArms) [W/m] | Conductor layer | 0.37 | 0.50 | 0.53 |
| | Shield layer | 0.15 | 0.20 | 0.22 |
| | Conductor layer plus shield layer | 0.52 | 0.70 | 0.75 |

As shown in Table III, the desired effect of the twisted filament type superconducting wires was not exhibited in the cable of Comparative Example 2 in which all superconducting layers were formed of twisted filament type superconducting wires: the AC loss increased compared to the cable of Comparative Example 1 in which all superconducting layers were formed of untwisted filament type superconducting wires. This is presumably because the AC loss was increased by the twisted filament type superconducting wires placed in the first layer of the conductor layer and in the second layer of the magnetic shielding layer, which were low-magnetic-field regions.

In contrast, in the cable of Example 1 in which twisted filament type superconducting wires were placed only in high-magnetic-field portions, the AC loss was reduced to about 75% of that of the cable of Comparative Example 1. Thus, the AC loss can be effectively reduced by using a twisted filament type superconducting wire only in a high-magnetic-field region and an untwisted filament type superconducting wire in a low-magnetic-field region.

Generally, twisted filament type superconducting wires require the twisting process, which results in increase of the wire cost, increasing the number of processing steps and reducing the yield due to breakage of superconducting filament wires. According to the present invention, twisted filament type superconducting wires are used in limited portions so that a low-loss cable can be obtained with the minimum increase of cost involved in the use of twisted filament type superconducting wires.

As described above, in the superconducting cable of the present invention, the use of twisted filament type superconducting wires allows the current path of the coupling current flowing between the matrix and the filaments to be separated at every half of the twist pitch. This allows the coupling current to quickly decay, thereby reducing the AC loss in a high-magnetic-field region. The cable of the present invention can therefore reduce the AC loss compared with a cable in which all superconducting layers are formed of twisted superconducting wires.

In the cable of the present invention, a degradation of current-carrying capability and an increase in the cost of cable, which are generally associated with the use of the twisted filament type superconducting wires, can be minimized by the combined use of a twisted filament type superconducting wire and an untwisted filament type superconducting wire.

In particular, the AC loss can be more effectively reduced while preventing a reduction in the current-carrying capability of the cable, by using a twisted filament type superconducting wire for forming the layer in which an applied magnetic field is large and of which the low loss effect is expected, and by using an untwisted filament type superconducting wire for forming the other layers.

What is claimed is:

1. A superconducting cable having a plurality of superconducting wires wound around a core material in a multilayered manner,
    wherein the superconducting wires include both a twisted filament type superconducting wire having spiral superconducting filaments and
    an untwisted filament type superconducting wire having straight superconducting filaments,
    wherein a conductor layer is formed with the superconducting wires wound around the core material in a multilayered manner, and at least the innermost layer of the conductor layer comprises an untwisted filament type superconducting wire, and at least the outermost layer of the conductor layer comprises a twisted filament type superconducting wire; and
    wherein a magnetic shielding layer is formed with the superconducting wires wound in a multilayered manner over an electrical insulation layer wound around the conductor layer, and at least the innermost layer of the magnetic shielding layer comprises a twisted filament type superconducting wire and at least the outermost layer of the magnetic shield layer comprises an untwisted filament type superconducting wire.

2. A superconducting cable according to claim 1, wherein the layers comprising twisted filament type superconducting wires account for ⅔ or less of the total superconducting layers comprising the superconducting wires.

3. A superconducting cable according to claim 1, wherein the number of twisted filament type superconducting wires account for ⅔ or less of the total number of the superconducting wires.

4. A superconducting cable according to claim 1, wherein each of the superconducting wires is structured such that a plurality of high-temperature superconducting filaments are embedded in an Ag or Ag-alloy matrix.

5. A superconducting cable according to claim 1, wherein a twist pitch of superconducting filament of the twisted filament type superconducting wire is in the range of 10 mm to 30 mm.

6. A superconducting cable according to claim 1, wherein a layer insulation is provided between superconducting layers formed of the superconducting wires.

7. A superconducting cable according to claim 1, wherein the winding pitch in at least one layer is different from the winding pitches in the remaining layers so that uniform current distribution can be obtained across the layers.

* * * * *